United States Patent [19]

Arima et al.

[11] 4,421,960

[45] Dec. 20, 1983

[54] STEERING WHEEL WITH SWITCH ASSEMBLY

[75] Inventors: Sumitsugu Arima, Yokosuka; Hiroshi Tsuda; Yukio Fukunaga, both of Yokohama, all of Japan

[73] Assignee: Nissan Motor Company, Limited, Yokohama, Japan

[21] Appl. No.: 287,944

[22] Filed: Jul. 29, 1981

[30] Foreign Application Priority Data

Sep. 5, 1980 [JP] Japan .......................... 55-126288[U]

[51] Int. Cl.³ ...................... H01H 9/00; H01R 39/00
[52] U.S. Cl. .................................. 200/61.54; 339/35
[58] Field of Search .............. 200/61.54, 61.57, 61.27, 200/61.3; 339/3 R, 3 S, 5, 6, 8, 9, 2 RL

[56] References Cited

U.S. PATENT DOCUMENTS

| | | | |
|---|---|---|---|
| 1,675,847 | 7/1928 | Fisher | 339/35 |
| 2,202,781 | 5/1940 | Kennedy | 180/78 |
| 2,203,281 | 6/1940 | Hollingsworth | 200/61.56 |
| 2,863,015 | 12/1958 | Ahrens | 200/61.54 |
| 3,548,128 | 12/1970 | Willett | 200/61.57 |
| 4,336,428 | 6/1982 | Berginski | 200/61.54 |
| 4,383,148 | 5/1983 | Arima et al. | 200/61.54 |

FOREIGN PATENT DOCUMENTS

| | | |
|---|---|---|
| 9264 | 3/1980 | European Pat. Off. . |
| 1261143 | 12/1961 | France .............................. 200/61.54 |
| 290472 | 4/1953 | Switzerland . |
| 2068859 | 8/1981 | United Kingdom . |

*Primary Examiner*—J. R. Scott
*Attorney, Agent, or Firm*—Lane, Aitken & Kananen

[57] ABSTRACT

A steering mechanism for a steerable vehicle such as an automotive vehicle, wherein a switch support structure positioned internally of the rim portion of a steering wheel and having incorporated therein a switch assembly including various electric switch units to be manually actuated is retained in position independently of the steering wheel and held against rotation with respect to a steering column tube fixed with respect to the body structure of the vehicle and wherein an optical display unit associated with the switch units or some of the switch units is securely supported in position in front of the steering wheel. The switch units are connected to electrically operated vehicular instruments through wire harnesses including those which are passed through the switch support structure and those which are passed through a member secured to the steering column tube.

13 Claims, 6 Drawing Figures

4,421,960

STEERING WHEEL WITH SWITCH ASSEMBLY

FIELD OF THE INVENTION

The present invention relates to a steering mechanism for a steerable vehicle such as a wheeled land vehicle and, more particularly, to a vehicle steering mechanism arranged with an accessory switch assembly positioned inside the rim portion of the steering wheel of the mechanism.

BACKGROUND OF THE INVENTION

One of the recent trends in designing automotive vehicles is to equip an automotive vehicle with various extra instruments and accessories. Typical examples of these instruments and accessories are audio players and drive computers (which are the instruments to display the fuel consumption rates and the scheduled times of arrival at the destinations of travel). Provision of the additional instruments and accessories has enhanced the centralization of the switches and the related wiring arrangements on the instrument panel and has made the setups of the instrument panel extremely intricate.

To avoid such problem, it has been proposed to have the switches arranged in a steering wheel pad assembly provided in conjunction with the steering wheel on which only a warning horn switch has conventionally been mounted. The installation of the steering wheel pad assembly in conjunction with the steering wheel however lays down a restriction on the placement of a display unit associated with the switches. If, for example, the display unit is incorporated into the instrument panel as has been customary, the switches associated with the display unit are located remote from the display unit and will bother a vehicle driver in manipulating the switches while viewing the display unit. If, on the other hand, the display unit is mounted on a column-tube covering shell enclosing the steering column tube, the display unit is located closer to the switches associated therewith but may be temporarily concealed behind the steering wheel pad assembly when the steering wheel is turned to steer the vehicle.

The present invention contemplates overcoming these problems by having the steering wheel pad assembly supported independently of the steering wheel and held against rotation with respect to the steering column tube fixed to the body structure of a vehicle.

SUMMARY OF THE INVENTION

In accordance with the present invention, there is provided a steering mechanism for a steerable vehicle including a body structure having a fore-and-aft direction, comprising a hollow steering column tube held stationary with respect to the vehicle body structure, a steering shaft axially extending in and through the steering column tube, the steering shaft having a center axis therethrough and being rotatable about the center axis of the steering shaft with respect to the column tube, a steering wheel rotatable with the steering shaft about the center axis of the steering shaft and having a circular rim portion having a center axis substantially aligned with the center axis of the steering shaft, a switch support structure positioned internally of the rim portion of the steering wheel, a switch assembly mounted within the switch support structure and including electric switch units to be manually actuated, a column-tube covering member held stationary with respect to the vehicle body structure and having at least a rear end portion of the steering column tube enclosed therein, retaining means retaining the switch support structure in position independently of the steering wheel and holding the switch support structure against rotation with respect to the steering column tube and the column-tube covering member, and an optical display unit securely supported by the column-tube covering member and positioned in front of the steering wheel.

The steering shaft of the steering mechanism thus constructed and arranged generally may have a rear end portion axially projecting rearwardly from the steering column tube while the steering wheel may form part of a steering wheel structure which further comprises a hub member secured to the rear end portion of the steering shaft, the switch support structure being rotatable about an extension of the center axis of the steering shaft with respect to the hub member.

In this instance, the above mentioned retaining means may comprise a first spool member fixed with respect to the steering column tube and formed with at least one circumferential groove about the center axis of the steering shaft, a second spool member having the switch support structure secured thereto and formed with at least one circumferential groove about the center axis of the steering shaft, the second spool member being rotatable on the hub member about the center axis of the steering shaft, and at least one flexible line which is wound partially in the circumferential groove in the first spool member and partially in the circumferential groove in the second spool member for providing retaining engagement between the first and second spool members through the line. The flexible line may form a loop and may be wound partially in a predetermined direction about the center axis of the steering shaft in the circumferential groove in the first spool member and partially in the circumferential groove in the second spool member in a direction identical with the above mentioned predetermined direction.

Alternatively, the retaining means of the steering mechanism according to the present invention may comprise a first spool member fixed with respect to the steering column tube and formed with at least two circumferential grooves about the center axis of the steering shaft, a second spool member having the switch support structure secured thereto and formed with at least two circumferential grooves about the center axis of the steering shaft, the second spool member being rotatable on the hub member about the center axis of the steering shaft, and at least two flexible lines each anchored at one end thereof to the first spool member and at the other end thereof to the second spool member, one of the flexible lines being wound in one direction about the center axis of the steering shaft partially in one of the two circumferential grooves in the first spool member and partially in one of the two circumferential grooves in the second spool member, the other of the flexible lines being wound in the other direction about the center axis of the steering shaft partially in the other of the two circumferential grooves in the first spool member and partially in the other of the two circumferential grooves in the second spool member.

BRIEF DESCRIPTION OF THE DRAWINGS

The features and advantages of a steering mechanism according to the present invention will be appreciated more clearly from the following description taken in conjunction with the accompanying drawings in which.

DESCRIPTION OF THE EMBODIMENTS

Figure 1:
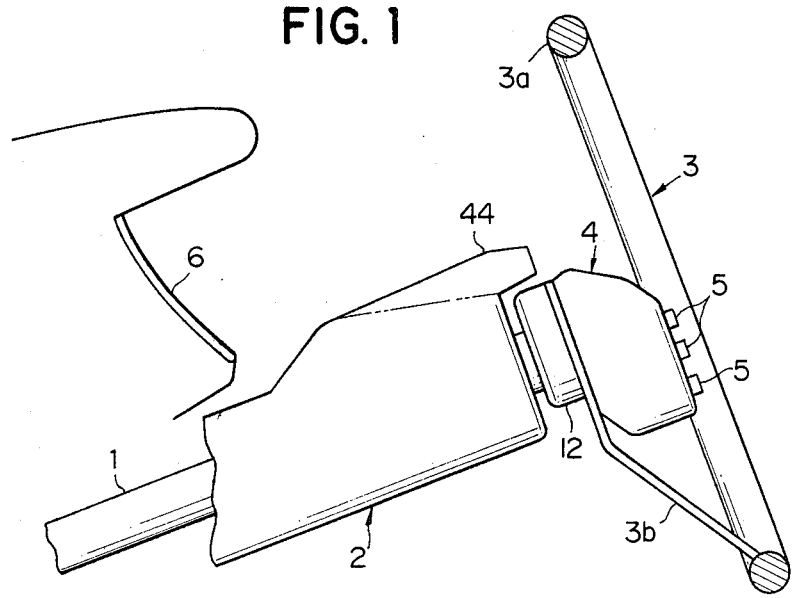
FIG. 1 is a partially cut-away side elevation view showing an embodiment of a steering mechanism according to the present invention and a portion of an instrument panel provided in combination with the steering mechanism is an automotive vehicle.
Figure 2:
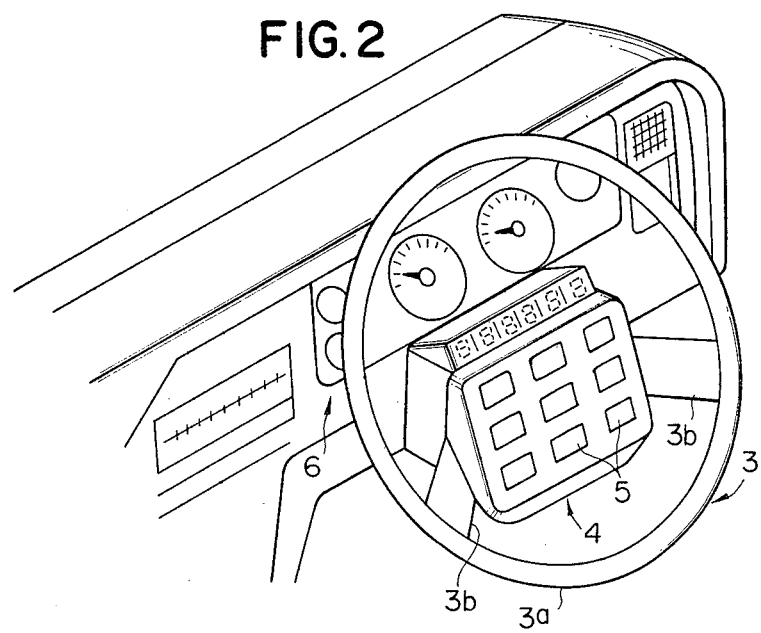
FIG. 2 is a fragmentary perspective view of the arrangement including the steering mechanism and the instrument panel illustrated in FIG. 1.

Referring to the drawings, first particularly to FIGS. 1 and 2 thereof, a steering mechanism embodying the present invention is shown as largely comprising an elongated, hollow steering column tube 1 which is in part housed within a column-tube covering shell 2 constructed of, for example, a synthetic resin. The steering mechanism herein shown is assumed, by way of example, as forming part of a steering system of an automotive vehicle and, thus, the steering column tube 1 and the covering shell 2 are fixedly held in position with respect to the body structure (not shown) by suitable fastening means. The steering mechanism further comprises a steering wheel 3 positioned at the rear of the covering shell 2 and comprising a circular rim portion 3a and a pair of spoke portions 3b radially extending inwardly from the rim portion 3a. Centrally of the steering wheel 3 is positioned a steering pad assembly 4 including a number of switching push buttons 5 arranged at the rear end of the pad assembly 4 in such a manner as to provide easy access thereto from the driver's seat of the vehicle. In FIGS. 1 and 2, the steering mechanism is shown further comprising an instrument panel 6 having various instruments and indicators mounted thereon and fixed with respect to the vehicle body structure as is customary in the art.

Figure 3:
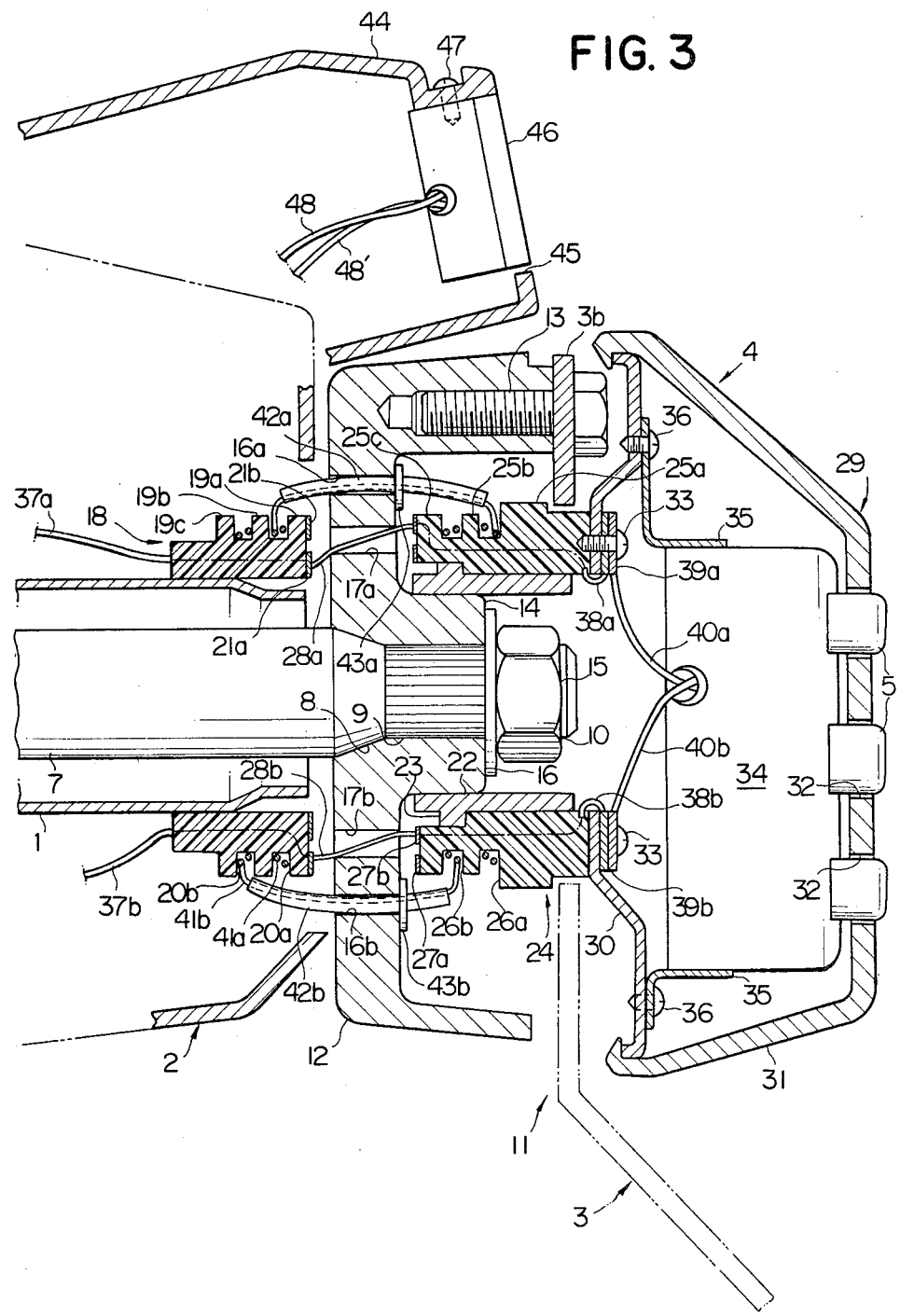
FIG. 3 is a sectional view, taken in a fore-and-aft direction of the vehicle, of the steering mechanism embodying the present invention.

Turning to FIG. 3 of the drawings, the steering mechanism embodying the present invention further comprises an elongated steering shaft 7 axially extending in the steering column tube 1 and coaxially rotatable about its center axis with respect to the steering column tube 1 and accordingly to the body structure of the vehicle. As is well known in the art, the steering shaft 7 is connected at or adjacent its foremost end to a suitable steering gear mechanism which in turn is connected through a suitable steering linkage to the front road wheels of the vehicle, though not shown in the drawings.

The steering shaft 7 has a rear axial extension having a rearwardly tapered axial portion 8 axially projecting outwardly from the rear end of the steering column tube 1, and a serrated axial portion 9 extending rearwardly from the tapered axial portion 8. The extension of the steering shaft 7 further has a threaded end portion 10 extending rearwardly from the serrated axial portion 9.

The previously mentioned steering wheel 3 forms part of a steering wheel structure 11 which further comprises a hollow, generally drum-shaped central hub member 12 which is coaxial with the rim portion 3a of the steering wheel 3. The central hub member 12 has a cylindrical side wall to which the spoke portions 3b of the steering wheel 3 are securely connected by bolts one of which is shown at 13. The hub member 12 is formed with a rearwardly open concavity and has a front end wall portion having an inner or rear face defining the front end of the concavity.

The hub member 12 has a cylindrical boss portion 14 axially projecting rearwardly from the above mentioned front wall of the hub member 12 into the concavity in the hub member 12. The boss portion 14 is coaxially surrounded by the inner peripheral wall of the hub member 12 and is formed with an axial bore which is open at both ends thereof. The axial bore in the boss portion 14 is formed conformingly to the tapered and serrated axial portions 8 and 9. The steering wheel structure 11 as a whole is fitted to the steering shaft 7 with the tapered and serrated axial portions 8 and 9 of the shaft 7 passed through the axial bore in the boss portion 14 and with the threaded rear end portion 10 of the shaft 7 projecting rearwardly from the boss portion 14 as shown. The steering wheel structure 11 is secured to the steering shaft 7 by means of a clamping nut 15 which is screwed on the threaded rear end portion 10 of the steering shaft 7 to the rear end face of the boss portion 14 through a washer 16. The axial bore in the boss portion 14 is aligned with the center axis of the steering shaft 7 so that the steering wheel structure 11 as a whole is held in coaxial relationship to the steering shaft 7 and accordingly to the steering column tube 1.

The central hub member 12 of the steering wheel structure 11 thus constructed and arranged has formed in its front end wall portion a first pair of axial holes 16a and 16b and a second pair of axial holes 17a and 17b. Each of the holes axially extends substantially in parallel with the center axis of the hub member 12 and is open forwardly at the front end of the hub member 12 and rearwardly into the concavity in the hub member 12. The axial holes 16a and 16b of the first pair are disposed substantially in a diametrically opposite relationship to each other across the center axis of the hub member 12. The axial holes 17a and 17b of the second pair are also located substantially in a diametrically opposite relationship to each other across the center axis of the hub member 12 and further radially inwardly of the axial holes 16a and 16b of the first pair.

The embodiment of the steering mechanism according to the present invention further comprises a hollow, generally cylindrical front spool member 18 which is coaxially secured to the outer peripheral surface of a rear end portion of the steering column tube 1 by suitable fastening means (not shown). The front spool member 18 is formed with three annular projections or flange portion which consist of a rearmost or first flange portion 19a, an intermediate or second flange portion 19b and a foremost or third flange portion 19c. As will also be seen from FIG. 3, the first, second and third flange portions 19a, 19b and 19c are axially spaced apart from each other so that the spool member 18 has a rear or first circumferential groove 20a between the first and second annular flange portions 19a and 19b and a front or second circumferential groove 20b between the second and third flange portions 19b and 19c. The front spool member 18 configured as described above is constructed of a suitable electrically non-conductive material.

The front spool member 18 has radially inner and outer or first and second annular contact elements 21a and 21b securely attached to the rear end face of the spool member 18. The first and second annular contact elements 21a and 21b are radially spaced apart from each other and are substantially coaxial with respect to the spool member 18 as will be seen from FIG. 3. The annular contact elements 21a and 21b are located adjacent to and slightly spaced apart forwardly from the outer face of the front end wall portion of the central hub member 12 as will be seen from FIG. 3.

The steering mechanism shown in FIG. 3 further comprises a cylindrical sleeve bearing 22 which is secured to the outer peripheral surface of the cylindrical boss portion 14 of the central hub member 12. The sleeve bearing 22 axially projects rearwardly from the rear end of the boss portion 14 and coaxially surrounds the nut 15 engaging the threaded rear end portion 10 of the steering column shaft 7. Furthermore, the sleeve bearing 22 has an annular projection or flange portion 23 located adjacent to the front axial end of the sleeve bearing 22, viz., to the inner face of the front end wall portion of the hub member 12. The flange portion 23 is located a predetermined axial distance from the rear end of the sleeve bearing 22 for the reason which will be clarified later. The sleeve bearing 22 has a smooth outer peripheral surface axially extending between the flange portion 23 and the rear axial end of the bearing 22 and serving as a bearing surface.

A hollow, generally cylindrical rear spool member 24 is coaxially received on this bearing surface of the sleeve bearing 22 and is axially and circumferentially slidable thereon. The rear spool member 24 is formed with three annular projections or flange portions which consist of a rearmost or first flange portion 25a, an intermediate or second flange portion 25b and a foremost or third flange portion 25c. The first, second and third flange portions 25a, 25b and 25c are axially spaced apart from each other so that the spool member 24 has a rear or first circumferential groove 26a between the first and second flange portions 25a and 25b and a front or second circumferential groove 26b between the second and third flange portions 25b and 25c.

The rear spool member 24 thus configured is axially and circumferentially slidable on the previously mentioned bearing surface of the sleeve bearing 22 and axially projects rearwardly beyond the rear end of the sleeve bearing 22. The axial movement of the spool member 24 toward the front end wall portion of the hub member 12 is limited by the flange portion 23 of the sleeve bearing 22. The spool member 24 is, furthermore, constructed of a suitable electrically non-conductive material.

The rear spool member 24 has radially outer and inner or first and second annular contact elements 27a and 27b securely attached to the front end face of the spool member 24. The first and second contact elements 27a and 27b are radially spaced apart from each other and are substantially coaxial with respect to the spool member 24. The annular contact elements 27a and 27b are located adjacent to and slightly spaced apart rearwardly from the inner face of the front end wall portion of the central hub member 12 as will be seen from FIG. 3.

The rear spool member 24 on the sleeve bearing 22 constitutes the first spool means in the steering mechanism according to the present invention. Likewise, the previously described front spool member 18 constitutes the second spool means in the steering mechanism according to the present invention.

The first and second contact elements 21a and 21b on the front spool member 18 are electrically connected to the first and second contact elements 27a and 27b, respectively, on the rear spool member 24 by slidable connector means. In FIG. 3, such connector means is shown comprising first and second conductive strip members 28a and 28b each constructed of an elastic, electrically conductive material. The first and second conductive strip members 28a and 28b are securely fitted to the front end wall portion of the central hub member 12 through the axial holes 17a and 17b, respectively, in the wall portion. The first and second conductive strip members 28a and 28b are elastically pressed each at one end against the first and second contact elements 21a and 21b, respectively, on the rear end face of the front spool member 18 and at the other ends thereof against the first and second contact elements 27a and 27b, respectively, on the front end face of the rear spool member 24. Thus, the first conductive strip member 28a provides sustained electrical connection between the first contact element 21a on the front spool member 18 and the first contact element 27a on the rear spool member 24. Likewise, the second conductive strip member 28b provides sustained electrical connection between the second contact element 21b on the front spool member 18 and the second contact element 27b on the rear spool member 24.

In the embodiment of the steering mechanism as shown in FIG. 3, the previously mentioned steering pad assembly 4 is shown comprising an accessory switch support structure 29 which is largely composed of an annular bracket member 30 and a generally drum-shaped finisher or casing member 31. The casing member 31 has a side wall portion secured along its front end to an outer end portion of the bracket member 30. The casing member 31 further has a rear end wall portion formed with a plurality of openings 32 and rearwardly spaced apart from the bracket member 30 so as to form an internal space therebetween. The bracket member 30 is securely attached along its inner circumferential end portion to the rear end face of the rear spool member 24 by suitable fastening means such as screws 33 as shown.

Within the open internal space thus formed in the accessory switch support structure 29 is positioned an electric switch assembly 34. The switch assembly 34 is supported by the annular bracket member 30 through a bracket member 35 secured to the bracket member 30 by screws 36 as shown. The previously mentioned switching push buttons 5 form part of the accessory switch assembly 34 and rearwardly project through the openings 32 formed in the rear end wall portion of the casing member 31.

The steering mechanism illustrated in FIG. 3 further comprises wire harness arrangements. Such arrangements comprise a first pair of electric wire harnesses 37a and 37b which extend, though not shown, from the electric circuits of suitable electrically operated vehicular instruments such as, for example, an electric warning horn, a motor-driven wind-shield wiper and a drive computer (not shown). The wire harnesses 37a and 37b are anchored and electrically connected at their leading ends to the first and second contact elements 21a and 21b, respectively, on the rear end face of the spool member 18.

The wire harness arrangements further comprise a second pair of wire harnesses 38a and 38b anchored and electrically connected each at one end thereof to the first and second contact elements 27a and 27b, respectively, on the front end face of the rear spool member 24. The wire harness 38a is anchored at the other end thereof to conductive fittings 39a securely attached to the rear end face of the rear spool member 24 by one of the previously mentioned screws 33, while the wire harness 38b is anchored at the other end thereof to conductive fittings 39b which are securely attached to the rear end face of the spool member 24 by another one of the screws 33, as shown.

The wire harness arrangements of the steering mechanism illustrated in FIG. 3 are complete with a third pair of wire harnesses 40a and 40b which are anchored each at one end thereof to the above mentioned fittings 39a and 39b, respectively, by the screws 33. The third pair of wire harnesses 40a and 40b are thus electrically connected to the second pair of wire harnesses 38a and 38b, respectively, and extend into the previously described switch assembly 34. The wire harnesses 40a and 40b are electrically connected to the various switch units (not shown) forming part of the switch assembly 34 and associated with the push buttons 5.

The steering mechanism shown in FIG. 3 further comprises a cord arrangement providing mechanical coupling between the front and rear spool members 18 and 24 therethrough. Such cord arrangement comprises a pair of lengthy, flexible cords consisting of first and second cords 41a and 41b of, for example, a resilient synthetic resin such as Nylon.

The cord arrangement further comprises elastic first and second guide tubes 42a and 42b which are closely passed through the previously mentioned axial holes 16a and 16b, respectively, in the front end wall portion of the hub member 12. Each of the guide tubes 42a and 42b has a front end portion axially projecting forwardly from the hub member 12 and a rear end portion axially projecting rearwardly from the hub member 12. The front end portions of the first and second guide tubes 42a and 42b terminate in the neighborhood of the first and second circumferential grooves 20a and 20b, respectively, of the front spool member 14. On the other hand, the rear end portions of the first and second guide tubes 42a and 42b terminate in the neighborhood of the first and second circumferential grooves 26a and 26b, respectively, of the rear spool member 24. The guide tubes 42a and 42b have flanges 43a and 43b, respectively, which are securely mounted or integrally formed thereon. The flanges 43a and 43b are retained to the inner or rear end face of the front end wall portion of the central hub member 12 by suitable retaining means (not shown). The guide tubes 42a and 42b are thus secured to the end wall portion of the hub member 12.

The first and second cords 41a and 41b are slidably passed, each partially, through these first and second guide tubes 42a and 42b, respectively. The first cord 41a passed through the first guide tube 42a extends forwardly and rearwardly from the opposite ends of the tube 42a and has opposite end portions wound in the first circumferential grooves 20a and 26a, respectively, in the front and rear spool members 18 and 24. Likewise, the second cord 41b passed through the second guide tube 42b extends forwardly and rearwardly from the opposite ends of the tube 42b and has opposite end portions wound in the second circumferential grooves 20b and 26b, respectively, in the front and rear spool members 18 and 24. The directions in which the first cord 41a is wound in the circumferential grooves 20a and 26a in the front and rear spool members 18 and 24 about the respective center axes of the spool members are identical with each other. Similarly, the directions in which the second cord 41b is wound in the circumferential grooves 20b and 26b in the front and rear spool members 18 and 24 about the respective center axes of the spool members are identical with each other but opposite to the winding directions of the first cord 41a. In the arrangement shown in FIG. 3, it is assumed, by way of example, that the first cord 41a is wound in a counter-clockwise direction in the first circumferential groove 20a in the front spool member 18 and in a counter-clockwise direction in the first circumferential groove 26a in the rear spool member 24 when viewed from the rear sides of the spool member 18 and 24. On the other hand, the second cord 41b is assumed to be wound in a clockwise direction in the second circumferential groove 20b in the front spool member 18 and in a clockwise direction in the second circumferential groove 26b in the rear spool member 24 when viewed from the rear sides of the spool members 18 and 24.

The first cord 41a has one of its opposite extreme and portions retained to the front spool member 18 and the other of the extreme end portions retained to the rear spool member 24 by suitable retaining means (not shown). Likewise, the second cord 41b has one of its opposite extreme end portions retained to the front spool member 18 and the other of the extreme end portions retained to the rear spool member 24 by suitable retaining means (not shown).

In the embodiment of the steering mechanism according to the present invention, the column-tube covering shell 2 is integral with a display support structure 44 which is positioned above the hub member 12 and which is formed with a horizontally elongated slot 45 at the rear end of the support structure 44. The display support structure 44 has an optical display unit 46 securely mounted therein by suitable fastening means such as screws 47 as shown and facing rearwardly through the slot 45 in the support structure 44. The optical display unit 46 may be constituted by, for example, a light-emissive-diode display device or a liquid-crystal display device and is electrically connected through wire harnesses 48 and 48' to a suitable control circuit (not shown) which is arranged on the body structure of the vehicle.

When, now, a driver's turning effort is applied to the steering wheel 3, the turning motion of the wheel 3 is transmitted from the central hub member 12 to the steering shaft 7. The steering wheel structure 11 and the steering shaft 7 are therefore rotated as a single unit about the center axis of the shaft 7 with respect to the steering column tube 1 which is held stationary with respect to the vehicle body structure. The turning motion of the steering shaft 7 is transmitted to the steering gear mechanism (not shown) and thereby operates the steering linkage to steer the front road wheels of the vehicle.

If, in this instance, the steering wheel 3 is caused to turn clockwise as viewed from the rear side of the wheel 3, the first cord 41a leading from the guide tube 42a on the turning hub member 12 is partially unwound from the first circumtial groove 20a in the front spool member 18 and additionally wound in the first circumferential groove 26a in the rear spool member 24. At the same time, the second cord 41b leading from the guide tube 42b on the clockwise turning hub member 12 is partially unwound from the second circumferential groove 26b in the rear spool member 24 and additionally wound in the second circumferential groove 20b in the front spool member 18. As a consequence, the first cord 41a is partially transferred from the front spool member 18 to the rear spool member 24 through the first guide tube 42a, while the second cord 41b is partially transferred from the rear spool member 24 to the front spool member 18 through the second guide tube 42b. It therefore follows that the rear spool member 24 is urged to turn clockwise by the tension in the first cord 41a being additionally wound on the spool member 24 and counter-clockwise by the tension in the second cord 41b being partially unwound from the spool member 24. The first and second cords 41a and 41b being arranged to be taut with substantially equal tensions, the forces thus urging the rear spool member 24 to turn in the clockwise and counter-clockwise directions are cancelled by each other. The rear spool member 24 carrying the switch support structure 29 is for this reason caused to circumferentially slide on the previously mentioned bearing surface of the sleeve bearing 22 turning with the steering wheel structure 11 and the steering shaft 7. The rear spool member 24, switch support structure 29 and switch assembly 34 are, as a consequence, maintained in their initial angular positions with respect to the steering column tube 1 irrespective of the turning motions of the steering wheel structure 11 and the steering shaft 7. In a like manner, the rear spool member 24, switch support structure 29 and switch assembly 34 are held in situ when the steering wheel structure 11 is caused to turn counter-clockwise when viewed from the rear side of the steering wheel 3.

When the first and second cords 41a and 41b are being transferred between the front and rear spool members 18 and 24 through the first and second guide tubes 42a and 42b, respectively, by the rotation of the steering wheel structure 11 with respect to the steering column tube 1, each of the guide tubes 42a and 42b is caused to elastically deflect toward the center axis of the steering shaft 7 by the tension in each of the cords 41a and 41b. Such deflection of the guide tubes 42a and 42b produces axial components in the tensions of the cords 41a and 41b being wound on and unwound from the rear spool member 24 which is axially slidable on the bearing surface of the sleeve bearing 22. The axial components of the tensions in the cords 41a and 41b urge the rear spool member 24 toward the front end wall portion of the hub member 12. The rear spool member 24 can therefore be moved with certainty into the axial position closely engaging the flange portion 23 of the sleeve bearing 22 by such axial components if the spool member 24 might have been rearwardly displaced a certain distance from such an axial position before the wheel structure 11 is turned. The rear spool member 24 is in this manner elastically held in the axial position engaging the flange portion 23 of the sleeve bearing 22.

During turning of the steering wheel structure 11 with respect to the steering column tube 1, the first and second conductive strip members 28a and 28b retained by the central hub member 12 of the steering wheel structure 11 are caused to turn together with the wheel structure 11 about the center axis of the steering shaft 7. Both of the front and rear spool members 18 and 24 being held at rest with respect to the steering column tube 1, the first conductive strip member 28a is caused to slide at the opposite ends thereof on the annular first contact elements 21a and 27a on the front and rear spool members 18 and 24, respectively. Likewise, the second conductive strip member 28b is caused to slide at the opposite ends thereof on the annular second contact elements 21b and 27b on the front and rear spool members 18 and 24, respectively. The electrical connection between the wire harnesses 37a and 40a and the electrical connection between the wire harnesses 37b and 40b are thus maintained through the first and second conductive strip members 28a and 28b, respectively, independently of the turning motion of the steering wheel structure 27.

Figure 4:
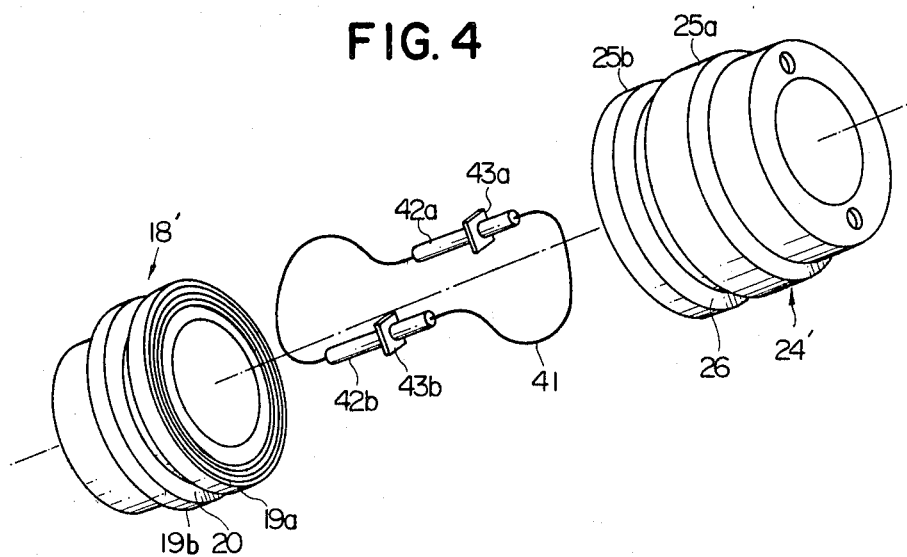
FIG. 4 is an exploded perspective view showing part of another embodiment of a steering mechanism according to the present invention.

While two cords 41a and 41b are used in the embodiment shown in FIG. 3, only a single cord may be utilized in lieu of the two cords. FIG. 4 of the drawings shows part of an embodiment using such a single cord.

In the arrangement shown in FIG. 4, there are provided front and rear spool members 18' and 24' as counterparts of the front and rear spool members 18 and 24, respectively, of the embodiment illustrated in FIG. 3. The front spool member 18' is formed with two annular projections or flange portions which consist of a rear or first flange portion 19a and a front or second flange portion 19b axially spaced apart from the first flange portion 19a so as to form a circumferential groove 20 therebetween. Similarly, the rear spool member 24' is formed with two annular projections or flange portions which consist of rear and front or first and second flange portions 25a and 25b so as to form a circumferential groove 26 therebetween. The front and rear spool members 18' and 24' thus configured are arranged similarly to their respective counterparts in the embodiment of FIG. 3 but in combination with a loop of a single flexible cord 41 of, for example, a resilient synthetic resin such as Nylon. The cord 41 is passed through elastic first and second guide tubes 42a and 42b respectively passed through the axial holes 16a and 16b in the central hub member 12 (FIG. 3) and having flanges 43a and 43b, respectively, securely mounted or integrally formed thereon similarly to their respective counterparts in the embodiment of FIG. 3.

The single cord 41 is wound approximately a half turn in the circumferential groove 20 in the front spool member 18' in a certain direction about the center axis of the spool member 18' and further wound approximately a half turn in the circumferential groove 26 in the rear spool member 24' in a direction identical with the direction in which the cord 41 is wound on the front spool member 18'. Each of the elastic guide tubes 42a and 42b is thus caused to elastically deflect toward the center axis of the steering shaft 7 (FIG. 3) by the tension in the cord 41. The cord 41 is in this fashion held taut on each of the front and rear spool members 18' and 24' with the result that the rear spool member 24' slidably received on the outer peripheral surface of the sleeve bearing 22 (FIG. 3) is urged to maintain a certain angular position with respect to the front spool member 18' about the center axis of the steering shaft 7.

Figure 6:
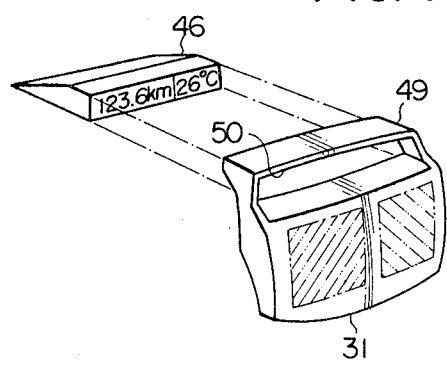
FIG. 6 is an exploded perspective view showing part of the arrangement illustrated in FIG. 5.
Figure 5:
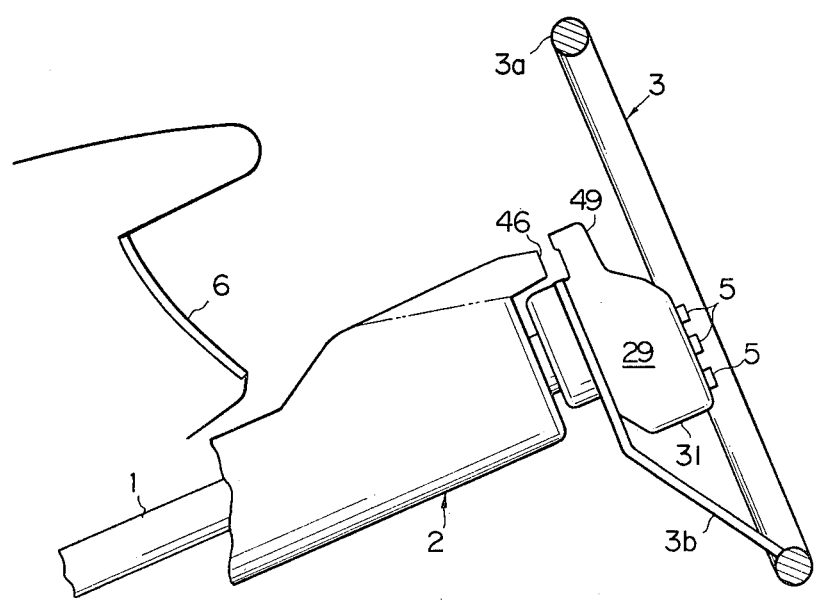
FIG. 5 is a view similar to FIG. 1 but shows still another embodiment of a steering mechanism according to the present invention and a portion of an instrument panel provided in combination with the steering mechanism.

FIG. 5 shows still another embodiment of the steering mechanism according to the present invention. In the embodiment herein shown, the casing member 31 forming part of the switch support structure 29 has an upper frame portion 49 formed with a horizontally elongated window 50 which is substantially coextensive with and rearwardly spaced apart from the rear end face of the optical display unit 46, as will be better seen from FIG. 6 of the drawings. The frame portion 49 thus provided at the rear end face of the display unit 46 is adapted to reduce the external light allowed to reach the rear end face of the display unit 46 so that a vehicle driver is permitted to clearly view the figures on the rear end face of the display unit 46 without being bothered by the light reflected from the rear end face of the display unit 46. The frame portion 49 being spaced apart from the rear end face of the display unit 46, furthermore, the spoke portions 3b of the steering wheel 3 are freely movable therebetween and accordingly the steering wheel 3 is permitted to turn without being interfered by the frame portion 49.

What is claimed is:

1. A steering mechanism for a steerable vehicle including a body structure having a fore-and-aft direction, comprising:
    a hollow steering column tube held stationary with respect to said body structure,
    a steering shaft axially extending in and through said steering column tube, the steering shaft having a center axis therethrough and being rotatable about the center axis with respect to the column tube,
    a steering wheel rotatable with the steering shaft about said center axis and having a circular rim portion,
    a switch support structure positioned internally of the rim portion of said steering wheel,
    a switch assembly mounted within said switch support structure and including an electric switch unit to be manually actuated,
    a column-tube covering member held stationary with respect to said body structure and having at least a rear end portion of said steering column tube enclosed therein,
    retaining means for retaining said switch support structure in position independently of the turning movement of said steering wheel and holding the switch support structure against rotation with respect to said steering column tube and said column-tube covering member, and
    an optical display unit supported by said column tube covering member and positioned in front of said steering wheel,
    said steering shaft having a rear end portion axially projecting rearwardly from said steering column tube and said steering wheel forming part of a steering wheel structure which further comprises a hub member secured to the rear end portion of the steering shaft, said switch support structure being rotatable about an extension of the center axis of the steering shaft with respect to said hub member,
    wherein said retaining means comprises a first spool member fixed with respect to said steering column tube and formed with at least two circumferential grooves about the center axis of said steering shaft, a second spool member having said switch support structure secured thereto and formed with at least two circumferential grooves about the center axis of the steering shaft, said second spool member being rotatable on said hub member about the center axis of the steering shaft, and at least two flexible lines each anchored at one end thereof to said first spool member and at the other end thereof to said second spool member, one of the flexible lines being wound in one direction about the center axis of the steering shaft partially in one of the two circumferential grooves in said first spool member and partially in one of the two circumferential grooves in said second spool member, the other of the flexible lines being wound in the other direction about the center axis of the steering shaft partially in the other of the two circumferential grooves in said first spool member and partially in the other of the two circumferential grooves in said second spool member.

2. A steering mechanism as set forth in claim 1, wherein said hub member is formed with a pair of axial holes substantially parallel with the center axis of the steering shaft and each open at one end thereof in the neighborhood of said first spool member and at the other end thereof in the neighborhood of said second spool member, said flexible lines being respectively passed each partially through said holes between the first and second spool members.

3. A steering mechanism as set forth in claim 2, wherein said retaining means further comprises a pair of flexible guide tubes fitted to said hub member respectively through said axial holes, each of the guide tubes having one portion axially projecting in one direction from the hub member and terminating in the neighborhood of said first spool member and another end portion axially projecting in the opposite direction from the hub member and terminating in the neighborhood of said second spool member, said flexible lines being partially passed through said guide tubes, respectively, between said first and second spool members.

4. A steering mechanism for a steerable vehicle including a body structure having a fore-and-aft direction, comprising:
    a hollow steering column tube held stationary with respect to said body structure,
    a steering shaft axially extending in and through said steering column tube, the steering shaft having a center axis therethrough and being rotatable about the center axis with respect to the column tube,
    a steering wheel rotatable with the steering shaft about said center axis and having a circular rim portion,
    a switch support structure positioned internally of the rim portion of said steering wheel,
    a switch assembly mounted within said switch support structure and including an electric switch unit to be manually actuated,
    a column-tube covering member held stationary with respect to said body structure and having at least a rear end portion of said steering column tube enclosed therein,
    retaining means for retaining said switch support structure in position independently of the turning movement of said steering wheel and holding the switch support structure against rotation with respect to said steering column tube and said column-tube covering member, and
    an optical display unit supported by said column tube covering member and positioned in front of said steering wheel,
    said steering shaft having a rear end portion axially projecting rearwardly from said steering column tube and said steering wheel forming part of a steering wheel structure which further comprises a hub member secured to the rear end portion of the steering shaft, said switch support structure being rotatable about an extension of the center axis of the steering shaft with respect to said hub member,
    wherein said retaining means comprises a first spool member fixed with respect to said steering column tube and formed with at least one circumferential groove about the center axis of said steering shaft, a second spool member having said switch support structure secured thereto and formed with at least one circumferential groove about the center axis of the steering shaft, said second spool member being rotatable on said hub member about the center axis of the steering shaft, and at least one flexible line which is wound partially in the circumferential groove in said first spool member and partially in the circumferential groove in said second spool member for providing retaining engagement between the first and second spool members through the line, and wherein said flexible line forms a loop and is wound partially in a predetermined direction about the center axis of the steering shaft in the circumferential groove in said first spool member and partially in the circumferential groove in said second spool member in a direction identical with said predetermined direction.

5. A steering mechanism as set forth in claim 4, wherein said flexible line is wound approximately a half turn in the circumferential groove in each of said first and second spool members.

6. A steering mechanism as set forth in claim 4, wherein said hub member is formed with a pair of axial holes substantially parallel with the center axis of the steering shaft and each open at one end thereof in the neighborhood of said first spool member and at the other end thereof in the neighborhood of said second spool member, said flexible line being passed partially through one of said axial holes and partially through the other of the holes.

7. A steering mechanism as set forth in claim 6, wherein said retaining means further comprises a pair of flexible guide tubes fitted to said hub member respectively through aid axial holes, each of the guide tubes having one end portion axially projecting in one direction from said hub member and terminating in the neighborhood of said first spool member and another end portion axially projecting in the opposite direction from the hub member and terminating in the neighborhood of said second spool member, said flexible line being passed partially through one of said guide tubes and partially through the other of the guide tubes.

8. A steering mechanism as set forth in either claim 1 or claim 4, wherein said second spool member is axially movable on said hub member.

9. A steering mechanism as set forth in claim 8, wherein said retaining means further comprises a generally cylindrical sleeve bearing secured to said hub member and having said second spool member slidably received thereon.

10. A steering mechanism as set forth in claim 9, wherein said sleeve bearing has an annular projection with which said second spool member is axially engageable when moved forwardly along the center axis of the steering shaft.

11. A steering mechanism as set forth in either claim 1 or claim 4, further comprising at least one annular contact element securely attached to said first spool member, at least one annular contact element securely attached to said second spool member, and at least one electrically conductive strip member secured to said hub member and held in slidable contact at one end thereof with one of the respective contact elements on the first and second spool members and at the other end thereof with the other of said contact elements.

12. A steering mechanism as set forth in claim 11, wherein said hub member is formed with at least one axial hole which is substantially parallel with the center axis of the steering shaft and through which said conductive strip member extends between said first and second spool members.

13. A steering mechanism as set forth in either claim 1 or claim 4, wherein said switch support structure has a frame portion formed with a window which is substantially coextensive with and rearwardly spaced apart from said display unit.

* * * * *